(12) United States Patent
Bayati et al.

(10) Patent No.: US 11,148,075 B2
(45) Date of Patent: Oct. 19, 2021

(54) DEVICE FOR SEPARATING SOLIDS FROM A FLUID STREAM

(71) Applicant: Sand Separation Technologies Inc., Acheson (CA)

(72) Inventors: Mohsen Bayati, Grande Prairie (CA); Chris Michael Johnston, Grande Prairie (CA); Cole William Schultz, Grande Prairie (CA); Dustin Mackenzie Wohlgemuth, Grande Prairie (CA)

(73) Assignee: Sand Separation Technologies Inc., Acheson (CA)

( * ) Notice: Subject to any disclaimer, the term of this patent is extended or adjusted under 35 U.S.C. 154(b) by 0 days.

(21) Appl. No.: 16/650,587

(22) PCT Filed: Sep. 20, 2018

(86) PCT No.: PCT/CA2018/051180
§ 371 (c)(1),
(2) Date: Mar. 25, 2020

(87) PCT Pub. No.: WO2019/056112
PCT Pub. Date: Mar. 28, 2019

(65) Prior Publication Data
US 2020/0230527 A1 Jul. 23, 2020

Related U.S. Application Data

(60) Provisional application No. 62/672,901, filed on May 17, 2018, provisional application No. 62/562,767, filed on Sep. 25, 2017.

(51) Int. Cl.
*B01D 45/08* (2006.01)
*B01D 21/26* (2006.01)
(Continued)

(52) U.S. Cl.
CPC ....... *B01D 21/265* (2013.01); *B01D 21/0042* (2013.01); *B01D 21/0087* (2013.01);
(Continued)

(58) Field of Classification Search
CPC ............ B01D 21/0042; B01D 21/0087; B01D 21/265; B01D 45/06; B01D 45/08;
(Continued)

(56) References Cited

U.S. PATENT DOCUMENTS 1,069,048 A * 7/1913 Wetherbee ............. B01D 21/26
210/512.3
1,345,090 A * 6/1920 Keller ................ B01D 21/2427
210/537
(Continued)

FOREIGN PATENT DOCUMENTS

| CN | 201212385 Y | 3/2009 |
|---|---|---|
| WO | 97/14489 A1 | 4/1997 |
| WO | 2015/024095 A1 | 2/2015 |

OTHER PUBLICATIONS

International Search Report for Application No. PCT/CA2018/051180, dated Dec. 7, 2018, 3 pgs.
(Continued)

*Primary Examiner* — Christopher Upton
(74) *Attorney, Agent, or Firm* — Seed IP Law Group LLP

(57) ABSTRACT

A separator vessel has inlet, fluid outlet, and sand outlet ports. Each of the fluid and sand outlet ports are spaced below the inlet port. The separator has an enclosure between the inlet and fluid outlet ports. The enclosure redirects the fluid stream and defines an inner cavity above a lower edge of the enclosure, the lower edge defining a liquid flow area. The separator has one or more vanes extending along an outer surface of the enclosure which redirect the fluid stream along a curved flow path as the fluid stream flows toward the
(Continued)

lower edge, and a plurality of apertures adjacent to the vanes, the apertures permitting fluid flow into the inner cavity of the enclosure. The fluid outlet port is disposed within the inner cavity above the lower edge of the enclosure and below one or more apertures.

30 Claims, 10 Drawing Sheets

(51) Int. Cl.
*B01D 21/00* (2006.01)
*B01D 45/16* (2006.01)
*E21B 43/34* (2006.01)
*B01D 45/06* (2006.01)

(52) U.S. Cl.
CPC ............. *B01D 45/06* (2013.01); *B01D 45/08* (2013.01); *B01D 45/16* (2013.01); *E21B 43/34* (2013.01); *B01D 2221/04* (2013.01)

(58) Field of Classification Search
CPC ..... B01D 45/16; B01D 2221/04; E21B 43/34; E21B 43/35
USPC ..................... 210/519, 521, 532.1, 540, 801; 166/75.12; 95/272; 55/463
See application file for complete search history.

(56) References Cited

U.S. PATENT DOCUMENTS

| | | | |
|---|---|---|---|
| 1,418,670 A * | 6/1922 | Olson | F22B 37/26 |
| | | | 210/512.1 |
| 2,893,510 A | 7/1959 | Spann | |
| 3,006,435 A * | 10/1961 | Alton | B01D 45/02 |
| | | | 96/360 |
| 3,403,497 A * | 10/1968 | Vander Mey | B01D 45/06 |
| | | | 95/210 |
| 4,376,676 A | 3/1983 | Gill | |
| 5,575,909 A | 11/1996 | Foster | |
| 5,597,489 A | 1/1997 | Schneider et al. | |
| 7,731,037 B2 | 6/2010 | Frazier et al. | |
| 7,785,400 B1 * | 8/2010 | Worley | B01D 45/08 |
| | | | 95/262 |
| 8,623,206 B2 * | 1/2014 | Wilder | C02F 1/003 |
| | | | 210/207 |
| 8,623,221 B1 * | 1/2014 | Boyd | B01D 19/0042 |
| | | | 210/801 |
| 2013/0228075 A1 | 9/2013 | Zylla | |
| 2014/0243571 A1 | 8/2014 | Lyon et al. | |
| 2016/0030861 A1 * | 2/2016 | Janssen | B01D 21/0042 |
| | | | 210/801 |

OTHER PUBLICATIONS

Supplementary European Search Report for EP Application No. 18858332.2 dated May 27, 2021, 15 pgs.

\* cited by examiner

DEVICE FOR SEPARATING SOLIDS FROM A FLUID STREAM

FIELD

This relates to a device for separating solids from a fluid stream. The device is particularly useful for separating sand from a fluid stream with a high flow rate, where the fluid stream is a multiphase stream, such as a stream that includes gas, liquid, and solid phases.

BACKGROUND

In many circumstances, it is necessary to separate solids from a fluid stream. For example, oil and gas wells often have sand entrained in the fluid stream that is produced from the well and sent through pipelines for refinement. This sand originates from many sources, such as hydraulic fracturing, rock formations, or material loss during drilling. Due to the varying sources of contamination, the particulate size also varies, usually from a few microns to several hundred microns in diameter. The particles below 100 microns in diameter are generally less of a concern for the downstream production equipment. On the other hand, sand greater than 150 microns in diameter is beneficial to be removed as it can cause severe damage to downstream equipment. While the discussion herein will focus primarily on fluid streams produced from hydrocarbon wells, there may be other situations in which it is desirable to remove sand from a fluid stream.

In the typical startup for a production well that was stimulated by hydraulic fracturing, large quantities of fracturing sand return to the surface along with the fluid stream. The rate of sand production from a well usually declines over a period ranging from one to several months, although some wells require the prolonged use of a desanding device due to continued sand production, which could be caused by communication to wells that are being fractured.

Sand creates problems for the safe and economical use of pipelines and downstream equipment due to erosion and plugging Erosion occurs from contact between the sand and any component that the flow stream makes contact with. This effect is similar to sand blasting, except even more destructive, due to the continuous action and the higher momentum of the carrier liquids compared to air. Erosion weakens pipelines and components which can lead to leaks and failures, causing safety and environmental issues. Plugging happens when the fluid stream is allowed to slow down, as when entering an inlet separator. In this scenario the fluid can no longer keep the solids flowing, and the sand is allowed to drop out and collect in the equipment or pipes. This is undesirable, as the sand takes up space in the pipeline, which can reduce efficiency, increase the resistance to flow, or can plug off the flow entirely.

Due to these problems it is advantageous to remove the sand as quickly and efficiently as possible, to reduce or eliminate the exposure of the equipment to the detrimental effects of sand.

Chinese patent no. CN201212385, entitled "High-pressure high flow rate oil, gas and water desander filtration apparatus" describes a system that uses screens or filters are used to remove the sand from the fluid stream. This method is effective at removing particles of very small diameter, but screens and filters can become plugged or can rupture.

U.S. Pat. No. 7,731,037 (Frazier et al.) entitled "Separating sand from fluids produced by a well" describes a system that uses a large tank for the separation of sand that is entrained in the fluid stream. The fluid is fed into the vessel, where it loses velocity, allowing gravity to pull the sand to the bottom of the vessel for extraction at a later date.

U.S. Pat. No. 5,597,489 (Schneider et al.) entitled "Method for removing contaminants from water" describes another system that uses filters to remove silt from the water.

SUMMARY

According to an aspect, there is provided a separator for separating solid matter from a fluid stream, comprising a vessel having an inlet port, a fluid outlet port, and a sand outlet port, each of the fluid outlet port and the same outlet port being spaced below the inlet port. An enclosure is disposed between the inlet port and the fluid outlet port that redirects the fluid stream passing from the inlet port to the fluid outlet port, the enclosure defining an inner cavity above a lower edge, the lower edge defining a liquid flow area. One or more vanes extend along at least a portion of an outer surface of the enclosure, the one or more vanes redirecting the fluid stream along curved a flow path as the fluid stream flows toward the lower edge. A plurality of apertures are adjacent to the one or more vanes, the plurality of apertures permitting fluid flow into the inner cavity of the enclosure. The fluid outlet port is disposed within the inner cavity at a height that is above the lower edge of the enclosure and below one or more apertures.

According to other aspects, there may be provided one or more of the following, alone or in combination. The inlet port may be aligned with a vertical axis of the vessel. The vessel may be a vertically oriented cylinder. The one or more vanes may define a spiral having an outer diameter that engages an inner surface of the vessel, and an inner diameter that engages the outer surface of the enclosure. The inner diameter of the vanes may increase as the fluid stream moves down the outer surface of the enclosure. The vanes may be angled downward from the enclosure toward the inner surface of the vessel. The enclosure may comprise a conical section having an increased diameter toward the fluid outlet port relative to the inlet port, and a skirt section having a constant diameter that extends below the conical section, the one or more vanes being mounted to the conical section of the enclosure. There may be one or more secondary baffle positioned within the enclosure, the one or more secondary baffle surrounding the fluid outlet port and having a bottom edge that extends below the fluid outlet port and defines a secondary liquid flow area. The bottom edge of the one or more secondary baffle may be spaced above the lower edge of the enclosure. At least one secondary baffle may comprise an upper edge that is above the height of the fluid outlet port and one or more flow openings that are at or below the height of the fluid outlet port. At least one secondary baffle may have an angled sidewall such that the secondary baffle has a decreased diameter toward the inlet port relative to the fluid outlet port. At least one secondary baffle may have a closed top. At least one secondary baffle may have an open top. There may be two or more secondary baffles, the two or more secondary baffles being positioned concentrically around the fluid outlet port, each secondary baffle having a different diameter such that an outer secondary baffle surrounds an inner secondary baffle, the bottom edge of the outer secondary baffle being level with or extending below the bottom edge of the inner secondary baffle relative to the fluid outlet port. In use, the height of the fluid outlet may define a liquid level within the inner cavity. A pitch of the one or more vanes may vary along the curved flow path to control a rotation speed of the fluid stream. At least one pair of adjacent vanes may be connected toward a top of the enclosure to form a pocket, at least one aperture is positioned within the pocket such that the pair of adjacent vanes defines an extended flow path between the fluid inlet port and the at least one aperture. There may be a laterally-extending baffle spaced below the lower edge of the enclosure and above a bottom of the vessel, the laterally-extending baffle reducing recirculation of particulates at the bottom of the vessel.

According to an aspect, there is provided a separator for separating solid matter from a fluid stream, comprising a vessel having an inlet port, a fluid outlet port, and a sand outlet port, each of the fluid outlet port and the sand outlet port being spaced below the inlet port. An enclosure is disposed between the inlet port and the outlet port that redirects the fluid stream passing from the inlet port to the outlet port, the enclosure defining an inner cavity above a lower edge, the lower edge defining a liquid flow area. An inner baffle is spaced within the enclosure, the inner baffle having a bottom edge that extends below the lower edge of the enclosure and an upper edge that extends above the lower edge of the enclosure, the inner baffle comprising one or more flow openings that are spaced between the bottom edge and the upper edge of the inner baffle. The fluid outlet port is at a height that is at or above the one or more flow openings of the inner baffle.

According to other aspects, the device may comprise one or more of the following features, either alone or in combination. The inlet port may be aligned with the vertical axis of the vessel. The enclosure may comprise one or more curved vanes on an upper surface of the enclosure that faces the inlet port, the one or more vanes inducing the fluid flow to flow along a curved flow path. There may be one or more secondary baffle positioned within the enclosure and within the inner baffle, the one or more secondary baffle surrounding the fluid outlet port and having a bottom edge that extends below the fluid outlet port and defines a secondary liquid flow area. The bottom edge of the one or more secondary baffle may be spaced below the lower edge of the enclosure. One or more secondary baffle may have an angled sidewall such that the secondary baffle has a decreased diameter toward the inlet port relative to the fluid outlet port. One or more secondary baffles may have a closed top. At least one secondary baffle may have an open top. There may be two or more secondary baffles positioned concentrically around the fluid outlet port, each secondary baffle having a different diameter such that an outer secondary baffle surrounds an inner secondary baffle, the bottom edge of the outer secondary baffle being level with or extending below the bottom edge of the inner secondary baffle relative to the fluid outlet port. In use, the height of the fluid outlet may define a liquid level within the inner cavity. The inner baffle may spiral inward toward each opening, the opening being perpendicular to the sidewall of the vessel.

According to an aspect, there is provided a sand separation device that uses a vessel that is rated for higher pressures, and specially designed internal components and specific fluid flow paths to separate sand to reduce the downtime caused by the use of filters and screens which plug up. The sand separating device is preferably placed in the production line after the wellhead of a hydrocarbon producing well, but before the production equipment to protect it from the detrimental effects of sand. The sand separator is contained in a pressure vessel that has an inlet on the top, a gas and liquid outlet on the side, and a sand outlet on the bottom. The separator is adjacent to the wellhead, although flow control may be before or after the separation vessel, and the fluid stream is allowed to enter the vessel in the upper gas region. Gas, water and condensate phases exit the vessel through the outlet in the lower portion of the vessel and continue downstream. The sand is collected in the vessel until a large amount has accumulated, at which point it can be emptied to a blown-down tank or to another vessel for storing sand.

The multiphase fluid stream enters into the vessel through the inlet on the top and flows through a connected nozzle that exits into a gas-filled region in the upper portion of the vessel. The gas expands into this open space, while the liquids and solids collide with a dome-shaped baffle. The collision with the dome disperses the solids and liquids across the dome surface, and imparts a rotation to the fluid as it travels down the spiraling vanes that cover the dome. The liquids and solids flow off the edge of the dome and collect in the bottom of the vessel, which is occupied by water. The sand is allowed to separate out of the mixture by gravity and centrifugal force as the liquid and gas move through the separator. The water and condensate also separate from each other while in the lower portion of the vessel, creating a layer of condensate at the interface. The condensate may then be directed through an optional internal baffle system described as a snow fence, which preferably spirals inward toward one or more dams distributed about the spiral baffle.

If included, the snow fence baffle system is placed inside of and underneath the dome so that all of the stream components (water, gas, condensate, and sand) flows underneath the edge of the dome or outer ring before any interaction with the snow fence. The snow fence is designed to permit condensate to flow over-top of the snow fence toward the fluid outlet due to its specific gravity being lighter than water, which leads to it overflowing the dams which are at the end of the spiraling baffle system. The dam at the end of the snow fence may be a solid, perforated, lined with saw teeth, or a combination of the three. The action caused by the snow fence creates recirculation regions which slow the fluid momentum and force the sand particles into the water which then allows them to sink the bottom of the vessel. The water, being heavier, is simply able to flow underneath the baffle system.

The gas that is released into the upper portion of the dome must push down around the dome edge, creating a "vapor lock" as it holds the liquid level depressed around the dome edge. The gas flows through a saw tooth cutout underneath the spiral dome, after which it can flow up and over the snow fence to get to the outlet.

According to another aspect, the gas phase is allowed to pass through holes in the dome rather than passing under the dome and over the snow fence.

Regardless of the gas conditions the water, condensate, and gas then travel towards the outlet pipe, which is surrounded by the inner ring and cap, which serve to control the levels of the phases. The gas goes over these obstacles, while the liquids go underneath to allow the sand to fall out of the fluid stream. The gas and liquid phases are then recombined at the outlet pipe.

According to another aspect, the fluid stream may be pumped from a natural body of water that contains silt or other solids. The separator is then used to remove or reduce the amount of silt, such as to supply clean water to another process. The clean water may be used in applications such as running through a heat exchanger for cooling, or as pretreated water for further filtration. A pump may be used to move the water through the separator and into the process equipment downstream. As such, the fluid stream would be primarily water with some entrained sand or silt. A stream of air or gas may be added to the inlet stream to allow the separator to work with a vapor lock.

The fluid stream enters the separator through the inlet nozzle on the top of the vessel. If an air stream is added to the inlet stream, the top of the vessel would contain some air or gas through which the entering fluid stream must travel upon leaving an inlet nozzle. The fluid stream strikes the spiral dome, and picks up centrifugal motion due to the spiral vanes as it flows down along the dome. Without any gas in the inlet stream to push down on the liquid, the water level in the vessel would be higher, partially submerging the dome; therefore, the water on the dome merges with the water in the vessel, causing the entire volume or body of fluid to rotate. The sand and silt are allowed to separate from the water by gravity and centrifugal action, and settle to the bottom of the vessel. The water then proceeds underneath the dome before going to the exit. Due to the concavity of the dome there will still be some trapped air or gas underneath the dome surface, which maintains the water level (under the dome) as it spirals to the outlet. The water and any excess gas then exit the vessel using the outlet pipe, and gravity acts as the primary method of sand separation due to the vessel having a higher liquid level, although any rotation that is developed at high water flow rates will also assist in separation.

According to an aspect, the fluid inlet is aligned vertically on the top of a vessel (spherical or cylindrical), and allows the entry of the fluid stream (which may contain gas, liquids, and solids) into the upper region of the vessel (which is occupied mostly by gas). The top-mounted inlet allows for the stream to spread out evenly to use the entire cross-sectional area of the vessel for dispersion. The gas in the inlet stream is allowed to expand into the gas-filled region, while the liquids and solids impact an enclosure, shaped as a dome with spiraling vanes on the top surface facing the fluid inlet surface, dispersing the stream and causing the fluid to rotate inside of the vessel. As more gas is introduced into the vessel it must find a route to escape to the outlet pipe.

According to an aspect, a method is used to remove the gas by pushing down on the liquid, which then seeps under the edge of the dome, which is preferably defined by a row of teeth. This process transfers any sand in the gas to the liquids due to rapid changes of direction. The edge of the dome creates a barrier that regulates the level of the liquids and gas by allowing more or less gas to flow through the teeth depending on the level of the liquid. This control is achieved using the geometry and location of the dome. Once the gas is through the teeth, it bubbles up the inside of the dome where it creates a second "vapor lock" on the underside of the dome. The gas on the inside of the dome flows over the snow fence and is drawn downwards into the inner ring, where it is recombined with the liquids as it is drawn into the outlet pipe. The liquids separate into water and hydrocarbons, if any, as they collect in the lower portion of the vessel. Both phases flow underneath the edge of the dome and then make contact with the snow fence baffle system. Any hydrocarbon condensate goes over the top, and water goes under the bottom, both of which develop vortices from their interaction, which causes sand to clump together and settle to the bottom of the vessel. The liquid proceeds towards the outlet pipe, and an angled inner ring blocks the liquid and forces it underneath its lower edge, causing more sand to drop to the bottom of the vessel. The wide opening on the bottom of the angled inner ring causes the liquid to be initially drawn up slowly to reduce dragging sand particles towards the outlet pipe. The cap on the outlet pipe helps draw liquid up more effectively, which helps to regulate the liquid level inside of the dome to preserve the vapor lock.

Another method of allowing the gas to access the outlet pipe is to provide a series of holes that are drilled through the dome that allow gas to pass through the dome. These holes are located on the dome in a manner that preferentially allows the transit of the gas to the inside of the dome rather than liquids and solids. The liquids and solids are encouraged to flow down the dome surface and under the bottom edge of the outer ring to get to the center of the vessel. During the downward flow, the spiral vanes continue to impart rotation to the fluid to cause the sand to collect against the vessel walls. Once on the inside of the dome, the liquids and gas take a route similar to that described above, except that the gas does not have to bubble up the dome walls creating a vapor lock.

In both examples, an enclosure, or dome, is used to promote sand entrained in the fluid stream to move to the wall of the vessel by centrifugal force and then settle to the bottom via gravity, and any sand remaining in the fluid stream is encouraged by the inner and outer rings to clump together and fall to the bottom of the vessel, where the sand is collected. As needed, the sand is removed from the vessel via a port on the bottom which is controlled by valves and/or chokes, which may be controlled manually or automatically.

BRIEF DESCRIPTION OF DRAWINGS

These and other features will become more apparent from the following description in which reference is made to the appended drawings, the drawings are for the purpose of illustration only and are not intended to be in any way limiting, wherein.

DETAILED DESCRIPTION

Preferred embodiments of certain separator vessels will now be described with respect to FIG. 1-10. It will be understood that the drawings are used for illustrative purposes only, and that modifications may be made to the designs described herein, and that illustrations are to be used for furthering understanding.

The separator is designed to use gravity and preferably centrifugal force to assist in the separation of sand from a fluid stream. Sand is a term used here to describe solid particulates that is entrained in the fluid stream. The sand may be naturally occurring or introduced due to human activities such as hydraulic fracturing, commonly referred to as fracking. The fluid stream may include both gas and liquid phases, and may include supercritical fluids, depending on the composition of the fluid stream and the pressure and pressure involved.

Figure 1:
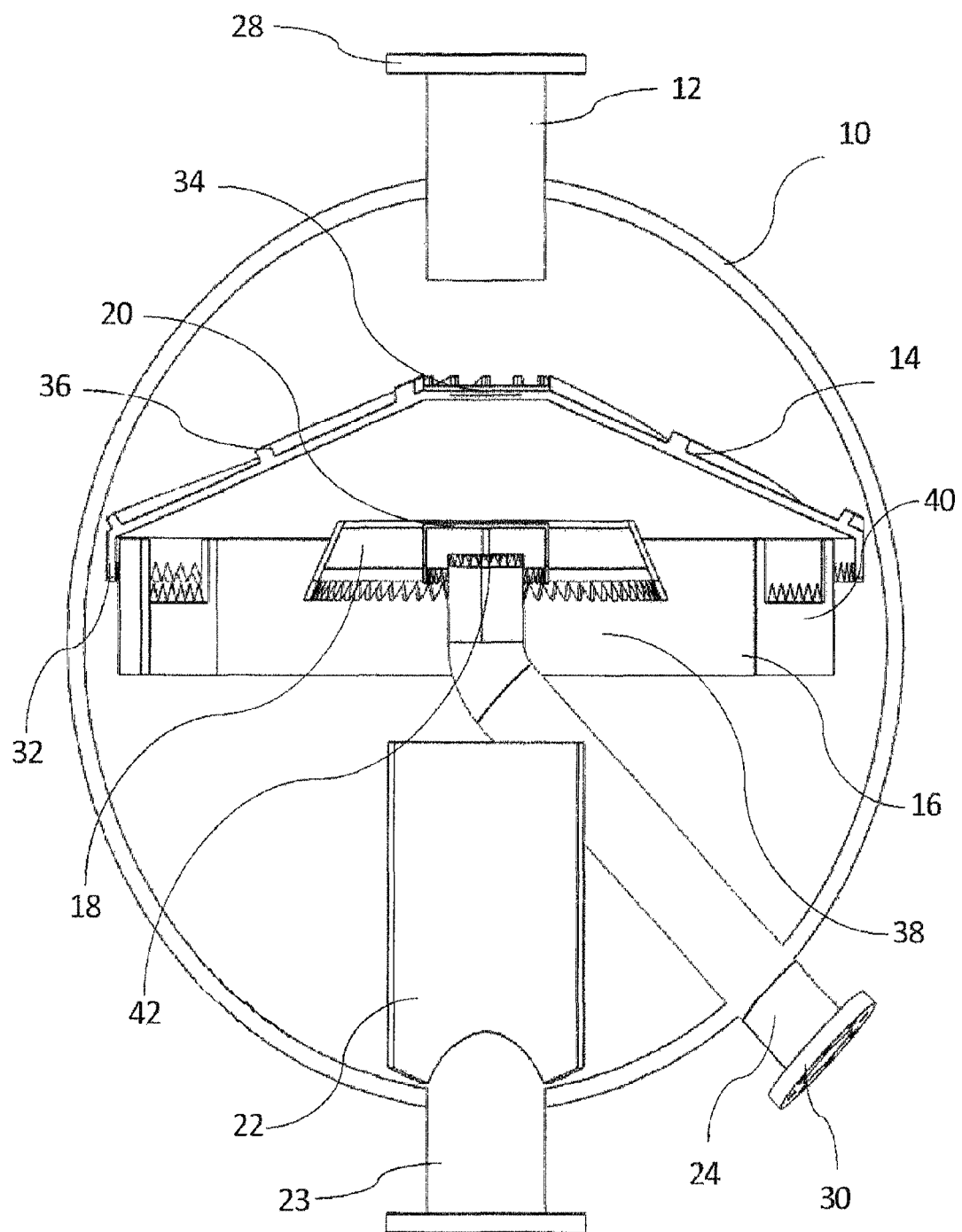
FIG. 1 is a cross-sectional view of the first embodiment of a separator device, showing the general orientation and position of the internal components within a spherical vessel.

The vessel 10 may be a spherical or cylindrical pressure vessel that has an inlet port 12 through which fluid enters the vessel, and an outlet pipe 24 through which fluid exits the vessel. Preferably, there is a sand outlet port 23 (as shown in FIG. 1) to remove sand that builds up in the vessel and inspection ports to provide visual inspection of the inside of the vessel.

The inlet 12 is a pipe that is fed from the fluid source, such as a well, production pipe line, or water pump. There may be a flange 28 on the outside of this port as shown to facilitate the connection to the fluid supply, however other methods of connection may be used. The inlet 12 extends into the vessel. In some examples, a nozzle may be attached or incorporated into the inlet 12. The nozzle may be made of wear resistant material to reduce the abrasive effects of the sand. The inlet 12 and nozzle direct the fluid stream into the vessel 10 and towards the spiral dome 14.

The spiral dome 14 is a cone that opens downwards, with a skirt-like ring 32 extending from its lower portion, and a flat area 34 on top. There may be triangular teeth cut into the lower edge of the ring 32. The dome may also include a wear plate that is attached to the flat top of the dome, in-line with the inlet nozzle. The wear plate may be removable to facilitate replacement through the inspection ports. The dome 14 also preferably has spiral-shaped vanes 36 attached to the top surface of the sides of the dome 14, such as from the wear plate to the ring 32 on the bottom, as depicted. The vanes 36 may also extend onto or beyond the ring 32. The spiral vanes 36 that are attached to the dome may be of constant pitch, or more complex. More complex spirals may include a pitch that changes as it descends the dome, making the fluid rotation faster or slower for the same vertical speed. The spiral may also include an angle that tilts the outside of the vane 36 downward relative to the dome to promote the liquids and solids to flow to the vessel wall. The spiral dome 14 may be used to create the vapor lock inside the vessel 10, to regulate the liquid levels, and to create the rotational movement of the fluid inside of the vessel 10.

In some embodiments, an inner baffle may be included, referred to herein as a snow fence 16. The snow fence is attached to the underside of the spiral dome 14 and sits within its footprint as seen in FIG. 1. The snow fence 16 may be beneficial, for example, when the liquid stream includes hydrocarbon condensate. The snow fence has baffles 38, and dams 40, that extend up from the bottom of the baffle 38 and have an upper edge that is spaced below the top of the baffle 38. While the dams 40 are open to the top of the baffle 38, the dams 40 may also be openings formed in the sidewall of the baffle 38, with a closed top. These dams 40 are designed to collect and control the flow of condensate through the vessel, causing it to flow over the lower portions of the snow fence 16 while water flows under the snow fence 16. In some embodiments, the lower portion of the snow fence 16 may have triangular teeth, perforating holes, or slots on it to cause more turbulence within the flow of fluid and to pierce the surface tension between the water and condensate phases. The snow fence 16 may be used to control the level of the condensate and to make the sand fall to the bottom of the vessel. A preferred shape of the baffles 38 used to control the flow of fluid can be seen in FIG. 4. Preferably, the baffles 38 spiral inward toward the dams 40, such that the baffles 38 are able to use the rotation of the fluid within the vessel to collect condensate and divert it over the lower portion of the snow fence 16.

Also shown is an inner ring 18, which may have different designs. For example, the inner ring may be a truncated cone that opens downward, or an open cylinder with a vertical sidewall. Preferably, the inner ring has triangular teeth on the lower edge. In some embodiments, the angled inner ring 18 may have supports that go to the snow fence 16 and spiral dome 14. In other embodiments, there may be supports that extend to the outlet pipe 24. The angled inner ring 18 may be used to help control the level of the liquid in the vessel 10, to promote sand separation, and to help draw the liquid up from below the outlet cap 20.

Figure 2:
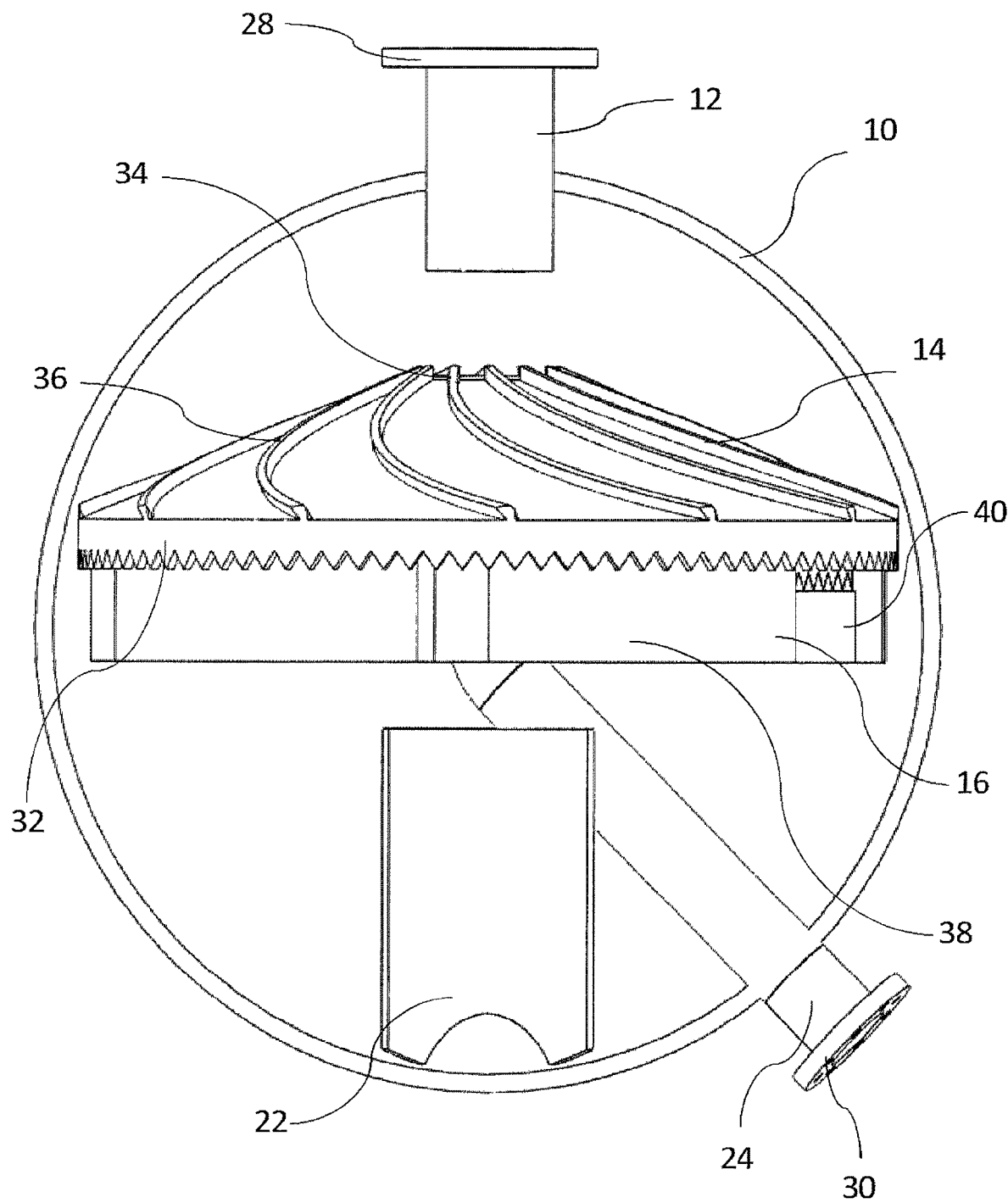
FIG. 2 is a partial cross sectional view of the internals of the separator device shown in FIG. 1.
Figure 3:
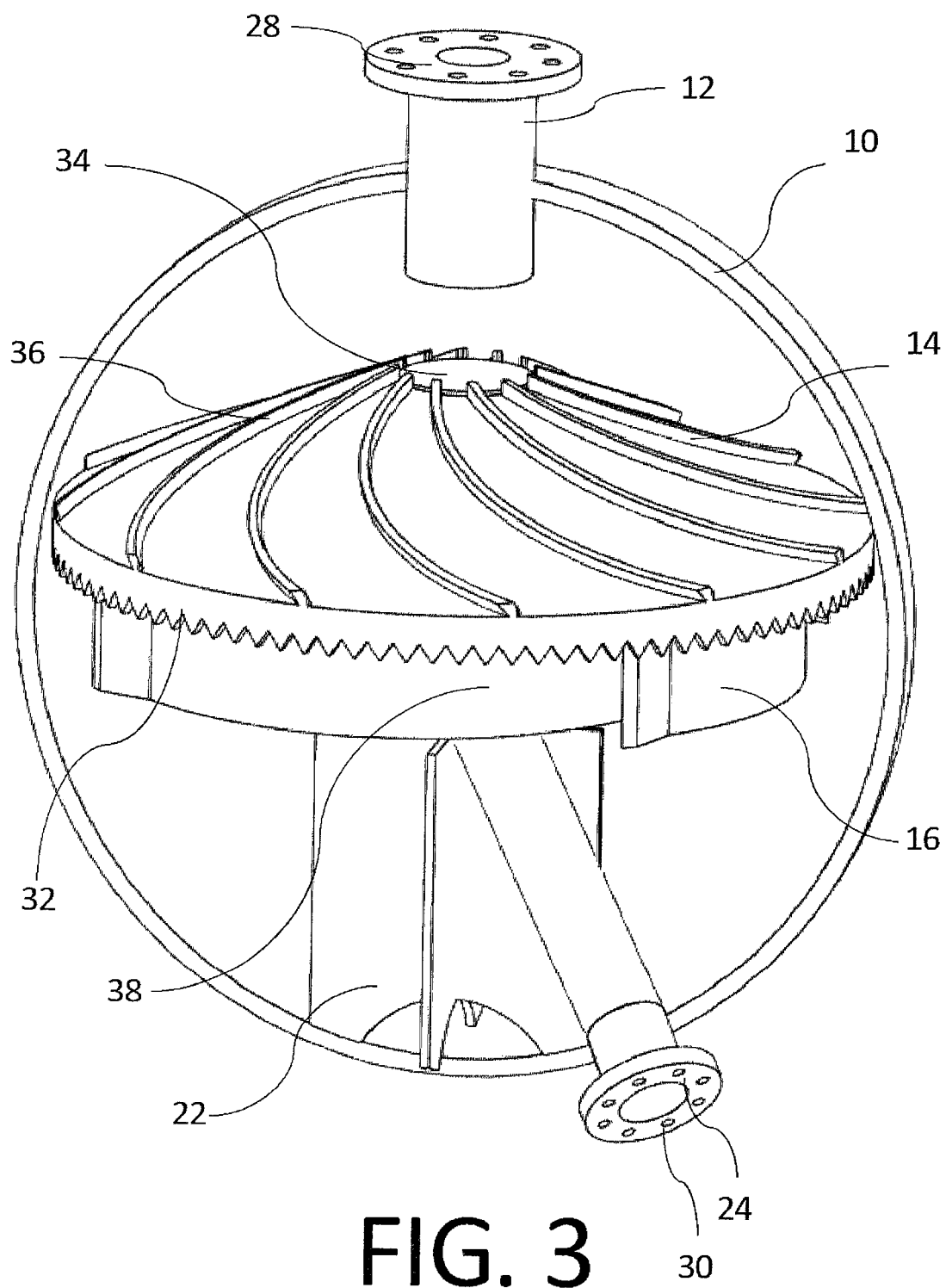
FIG. 3 is a partial cross sectional view in perspective of the separator device shown in FIG. 1.
Figure 4:
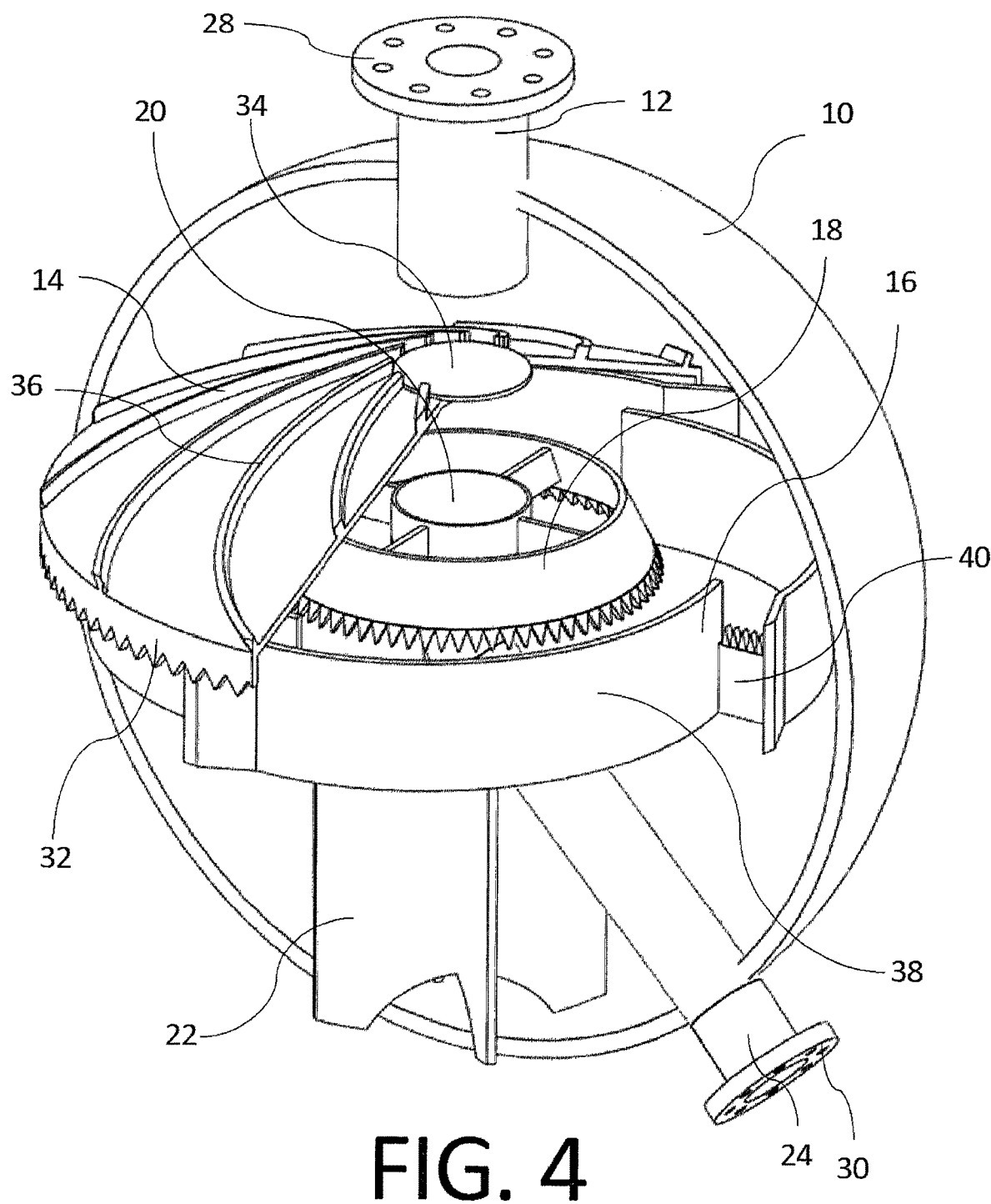
FIG. 4 is a partial cross sectional view in perspective with a cut away portion of the separator device shown in FIG. 1.

There may be an outlet cap 20, which, in the depicted embodiment, is a capped ring that goes over the outlet pipe 24. The outlet cap 20 may be supported by the outlet pipe 24 or it may be supported by the inner ring 18. The outlet cap 20 may be used to redirect the flow of fluid up the sides of the outlet pipe 24, then around and down into the outlet pipe 24. As depicted in FIG. 2, the outlet cap 20 may be used to regulate the liquid level inside the vessel 10. If the liquid level rises, more liquid is drawn out of the vessel because the liquid is closer to the relative low pressure of the outlet 24. In addition, as the liquid level falls, the low pressure has less effect on the liquid and more area is open for gas to escape.

As shown, there may be a vortex breaker 22, which may be made up of two flat plates that are perpendicular to each other fixed to the bottom or walls of the vessel 10. The vortex breaker may extend vertically towards the center of the vessel 10 and in some embodiments may be used as support for the outlet pipe 24. The plates may have cut-outs in the bottom to aid in the removal of sand. The vortex breaker 22 may be used to dissipate unwanted vortices that might extend to the outlet 24, and to slow the movement of the fluid near the bottom of the vessel to allow the sand to settle.

The outlet pipe 24 is a conduit that has an outlet port 42 preferably spaced from the sidewalls of the vessel within the enclosure 14, and preferably near the center of the vessel under the dome. Preferably, the outlet pipe extends out at an angle that encourages flow of fluid. As shown, the outlet pipe extends downward to an elbow, the elbow turns the pipe towards the side of the vessel, and the pipe continues out of the vessel. Optionally, the outlet pipe 24 may have triangular teeth on its top edge, and there may be a flange 30 on the bottom edge as shown on the outside of the vessel. The outlet pipe draws the fluid from the center of the vessel and allows it to exit to the downstream pipeline.

There may be an outer ring 26, which is sealed to the base of the dome 14. The depicted outer ring may be particularly useful in the embodiments with holes 44 drilled in the dome 14. The ring 26 may be considered an extension of the existing "skirt" 32 around the dome bottom. The ring 26 acts as a baffle, forcing the liquid to go underneath the lower edge, which proves a column of water that increases the pressure required for gas to pass under the dome 14, thereby encouraging the gas to flow through the holes 44 in the dome 14 instead. As with the skirt 32, the outer ring may have a sawtooth pattern incorporated into its lower edge. The outer ring 26 may also be closer to the wall of the vessel 10 compared to the dome 14, creating more resistance to flow, which also promotes gas movement through the holes 44 in the dome 14. As the liquid level is generally set by the height of the outlet port 42, this also provides a similar liquid level around the outer ring 26 outside the enclosure 14.

For illustrative purposes, there will now be described the operation of embodiments of a separation device. The actual operation may vary, depending on the actual design of the separation device.

In normal operation, the vessel 10 is filled with fluid up to the lower edge of the spiral dome 14. If the vessel 10 is empty upon start-up, sand carryover may be observed until the separator is filled and reaches a pseudo steady state condition. However, it is unlikely that a steady state will be maintained due to variation in flow regime in the inlet fluid from the well. If this carryover is unacceptable, then the vessel 10 may be prefilled with water to the normal operating level to reduce the time needed to reach safe operating conditions.

The fluid from the well enters the vessel through the inlet 12 that is located at the top of the vessel 10. This inlet may have a nozzle which extends into the gas-filled upper region of the vessel which directs the fluid stream at the top surface of the spiral dome 14. Once the fluid is released into the upper region of the vessel, 10 the gas expands to fill this upper hemisphere, and helps to slow the velocity of the fluid stream. The impact with the flat surface 34 on top of the dome 14 will also cause gas to dissipate into the top of the vessel 10 while the liquids and solids run down the top of the spiral dome 14. The spiral vanes on the dome 14 catch the liquids and solids and impart a rotational motion as they descend, before passing over the edges of the dome 14. The gas, water, and any hydrocarbon condensate are then forced to go under the toothed edge of the spiral dome 14, causing the flow to make a sharp turn, at least 90 degrees, which the solid particles cannot make due to higher momentum caused by their heavier mass. The inability of the particles to make the turn directs them down to the bottom of the vessel 10, while the lighter fluid turns and continues under the dome 14 at which point the fluids contact the snow fence 16. In the bottom of the vessel, the solids are allowed to separate from the liquid phase due to gravity and are pushed toward the sidewall of the vessel by any centrifugal force imparted by the vanes 36. The solids fall to the bottom while the water fills the majority of the bottom of the vessel. If the liquids include hydrocarbon condensates, these may form a layer on top of the water, as they are lighter than water. Within the dome 14, the gas flows over the top of the snow fence 16 and the water goes under the bottom, while the condensate floats on the water between the walls of the fence, with the water below and the gas above. Trapping the condensate causes it to flow over the lower part of the snow fence 16, which causes the fluid to slow further and create recirculation zones that allow additional sand to fall to the bottom of the vessel. The liquid on the inside of the snow fence 16 must then go underneath the angled inner ring 18, which encourages more sand to settle to the bottom of the vessel 10. The gas flows over the top of the angled inner ring 18 toward the outlet 42. The depth of the inner ring 16 may be used to control the level of the condensate as the condensate displaces water, which flows under the ring toward the outlet pipe 24. Once inside the inner ring 18, the fluid is drawn up by the outlet cap 20 and into the outlet pipe 24. The closed outlet cap 20 forces fluid to be drawn up from the bottom which helps to control the level of the liquid as the gas has to be simultaneously drawn down and then around the outlet cap 20 to escape the vessel 10 with the liquids. The liquid and sand that is in the bottom of the vessel has a rotation in the direction of the spiral vanes 36 that is reduced by the vortex breaker 22 so that the sand is allowed to settle via gravity.

FIG. 1 depicts an example of the relative positioning of the internal geometries of the various baffles, and how the fluid will flow under the dome 14. As the fluid makes a sharp turn that helps remove sand, the gas flows over the snow fence 16 and is forced to make additional mutually orthogonal turns as it enters into the top of the inner ring 18, then into the outlet cap 20. The water flows under the snow fence 16 and inner ring 18 and proceeds to the outlet cap 20, where it is drawn up and exits the vessel 10. The condensate flows over the lower portion of the snow fence 16, which encourages sand entrained in the condensate to fall to the bottom of the vessel 10. The condensate also flows under the toothed edge of the angled inner ring 18, which encourages more sand to settle, and the clean condensate is drawn up by the suction of the outlet cap 20 along with the water and gas. The actual flow of each phase will depend on the relative amounts of each in the vessel 10 at the various stages.

Another example of a separator device is shown in FIGS. 5-9. In this example, the vessel is shown as a cylindrical pressure vessel 10 that has a vertical orientation. The fluid stream enters the vessel through the inlet 12 on the top of the vessel 10, and is directed through the gas filled upper region of the vessel 10 where the gas is allowed to expand and occupy the space. The stream of liquids and solids strike the wear plate 34 on the top of the dome 14, and begin to run down the dome 14, accelerating and gaining rotational momentum due to the spiral vanes 36, the outer edge of which are preferably close to, or in contact with, the inner surface of vessel 10. This results in liquids and solids being pushed outward toward the walls of the vessel 10. Holes 44 are drilled part way down the dome 14 under the spiral vanes 36 that are designed to allow gas to escape to the inside of the dome 14 while the liquids and solids flow down the vanes 36 to the bottom of the dome 14. As the liquids and solids proceed down the spiral vanes 36, the liquid and solids accelerate due to the decrease in flow area, and then accelerate further as they pass the outer ring 26 due to the decrease flow area between the ring 26 and the wall. The liquids are forced down by the pressure of the gas, causing a high speed, sharp turn to go under the lower edge of the outer ring 26, which encourages the separation of sand as a result of the higher momentum of the solid particle. The rotating fluid and sand that exits the gap between the outer ring 26 and vessel 10 imparts rotational energy to the fluid in the lower portion of the vessel 10. The rotation is used to encourage the sand toward the outer wall of the vessel 10 and away from the outlet pipe 24 as it settles to the bottom. The liquid inside the outer ring 26 then rises up the inside of the outer ring 26. In some embodiments, the liquid may make contact with a snow fence (not shown) similar to what was described previously with respect to the spherical vessel. The snow fence, if present, collects the condensate and traps it between the walls of the snow fence 16 and outer ring 26, which then causes it to flow over the lower portion of the snow fence 16. The action of going over the snow fence 16 causes regions of turbulence and recirculation that encourage sand to clump together, which causes the sand to transfer to the water then settle to the bottom of the vessel 10. The water that rises up with the condensate and flows under the walls of the snow fence 16 as it proceeds to the exit 42. Once within the dome 14, or within in the middle of the snow fence 16 if present, the liquids then must push under the inner ring 18, which also encourages sand to bunch together and fall to the bottom of the vessel 10 by acting as a block and creating turbulence. If incorporated, the cone shape of the angled ring 18 increases the area of suction for the outlet pipe 24, which reduces the velocity of the liquid so that any remaining sand particles are not dragged up by the flow. The gas, after going through the holes 44 in the dome 14, flows toward the angled inner ring 18 and gets drawn into it. The liquids and gas then mix as they are drawn up by the outlet cap 20 and into the outlet pipe 24 to exit the vessel. The vortex breaker 22 in the bottom of the vessel 10, if present, reduces the motion of the fluid to allow the sand to settle, and reduces the amount of sand that is re-entrained in the liquid after it has settled.

In some examples, inner ring 18 may be a cone with an open bottom that surrounds the outlet, such that all phases must flow under the bottom edge of the cone. This design may be beneficial, for example, where a low amount of gas is expected, such that liquids and not just gas flow through the openings 11 in the enclosure 14. Liquids that enter through the openings 44 in the enclosure 14 then flow down the outside of the cone 18, and under its bottom edge.

In another example, the fluid stream entering the separator may be composed of water with entrained silt and/or sand. The fluid stream enters the vessel 10 through the inlet 12 on the top of the separator, and passes through a nozzle before being directed at the spiral dome 14. The fluid stream makes contact with the wear plate 34 on the top of the dome 14 at which point it is redirected down the sides of the dome 14. The spiral vanes 36 on the dome 14 impart a bulk rotation to the fluid as it travels down towards the liquid level, causing it to develop a cyclonic behavior in the bottom of the vessel 10. The rotation in the vessel 10 causes the water and sand to take a longer path to the outlet pipe 24, thereby giving more time for gravity to separate the particles. The water is then forced under the spiral dome 14 and past the internals on the way to the outlet pipe 24. The snow fence 16 may or may not be included, and the inner ring 18 acts like a block to the water because the water is forced under the ring, which causes sand to be pushed to the bottom of the vessel. The outlet cap 20 and outlet pipe 24 collect fluid from below and let it escape to maintain the liquid level in the vessel 10. The vortex breaker 22 is in the bottom of the vessel 10 prevents excessive rotation from entraining particles up from the bottom after they have settled. Recirculation of particles may also be reduced by including an obstruction, such as a baffle 46 as shown, that is below enclosure 14 and above outlet pipe 24, while still providing a sufficient flow area from the top to the bottom of vessel 10 to allow particles to settle, or liquid to circulate, as required.

Figure 8:
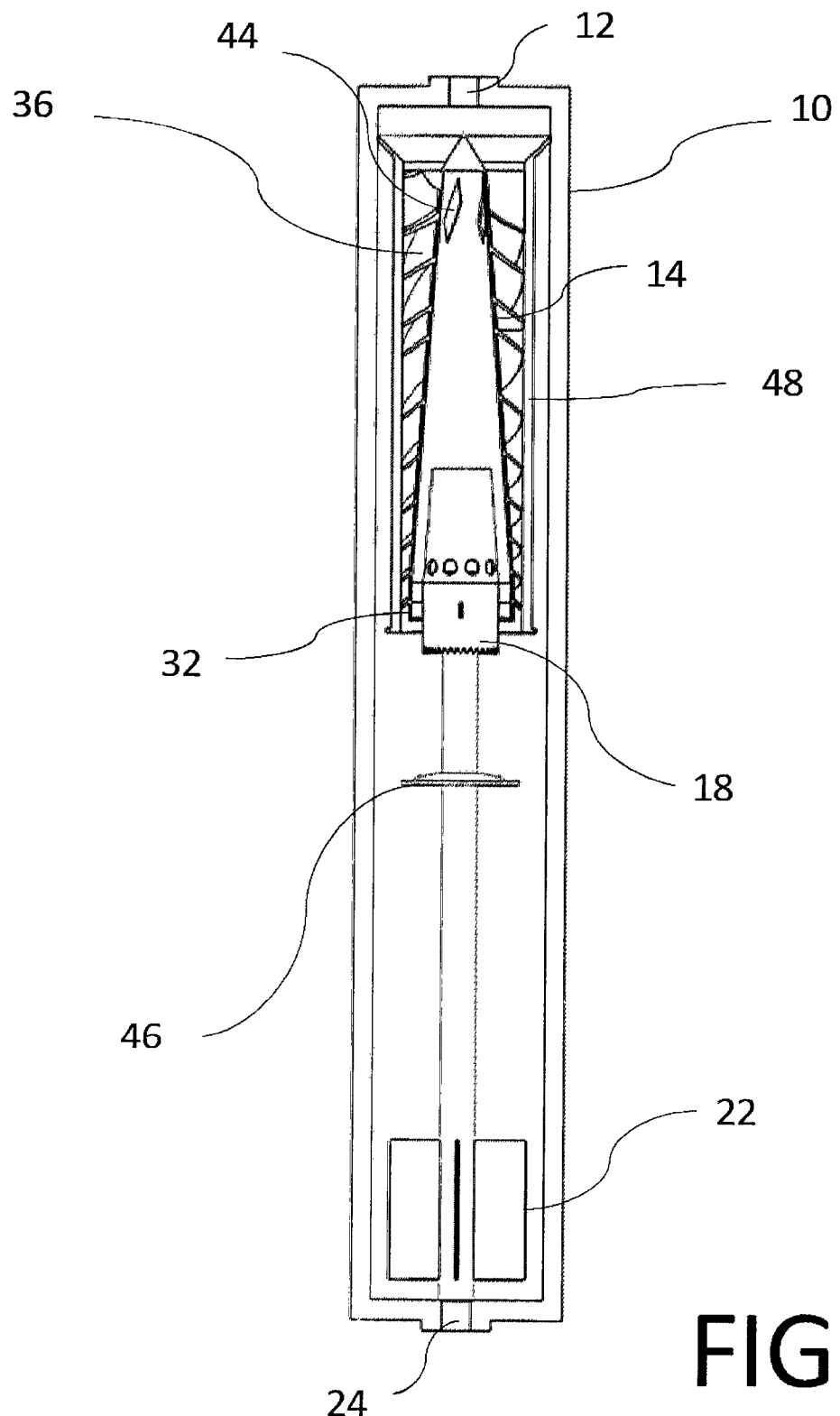
FIG. 8 is a partial cross-sectional view of another alternative cylindrical vessel.

Referring to FIG. 8, vessel 10 may include an insert 48 that surrounds enclosure 14. Insert 48 may be used to allow for a better seal between vanes 36 and the inner surface of vessel 10. This may be beneficial if vessel 10 includes variations in its surface due to the manufacturing process, such as the presence of a weld, variations in the radius of curvature, etc. that may be present, such as when the outer wall of vessel 10 is formed by rolling and welding plate steel. In such circumstances, it may be easier and less expensive to manufacture insert 48 with greater accuracy to provide a better seal against vanes 36. Insert 48 may also be used to reduce the inner diameter of vessel 10 and therefore the flow area through vanes 36. This may be particularly useful, for example, in low flow circumstances, as a lower flow area will result in a higher fluid velocity and a more desirable rotational speed of the fluid. The thickness of insert 48, or in other words, the inner diameter of insert 48, may be selected to provide the desired flow area based on the expected flow rate through vessel 10. In addition to reducing the flow area past vanes 36, insert 48 also allows vessel 10 to have a larger volume below enclosure 14, such that more particulate material may be collected in vessel 10, extending the time between cleanout operations. In addition, as the fluid flow encounters the change in diameter from the smaller diameter provided by insert 48 to the larger diameter of vessel 10, there will be a change in velocity and direction of the fluid, which further encourages phase separation of the fluid stream.

Figure 5:
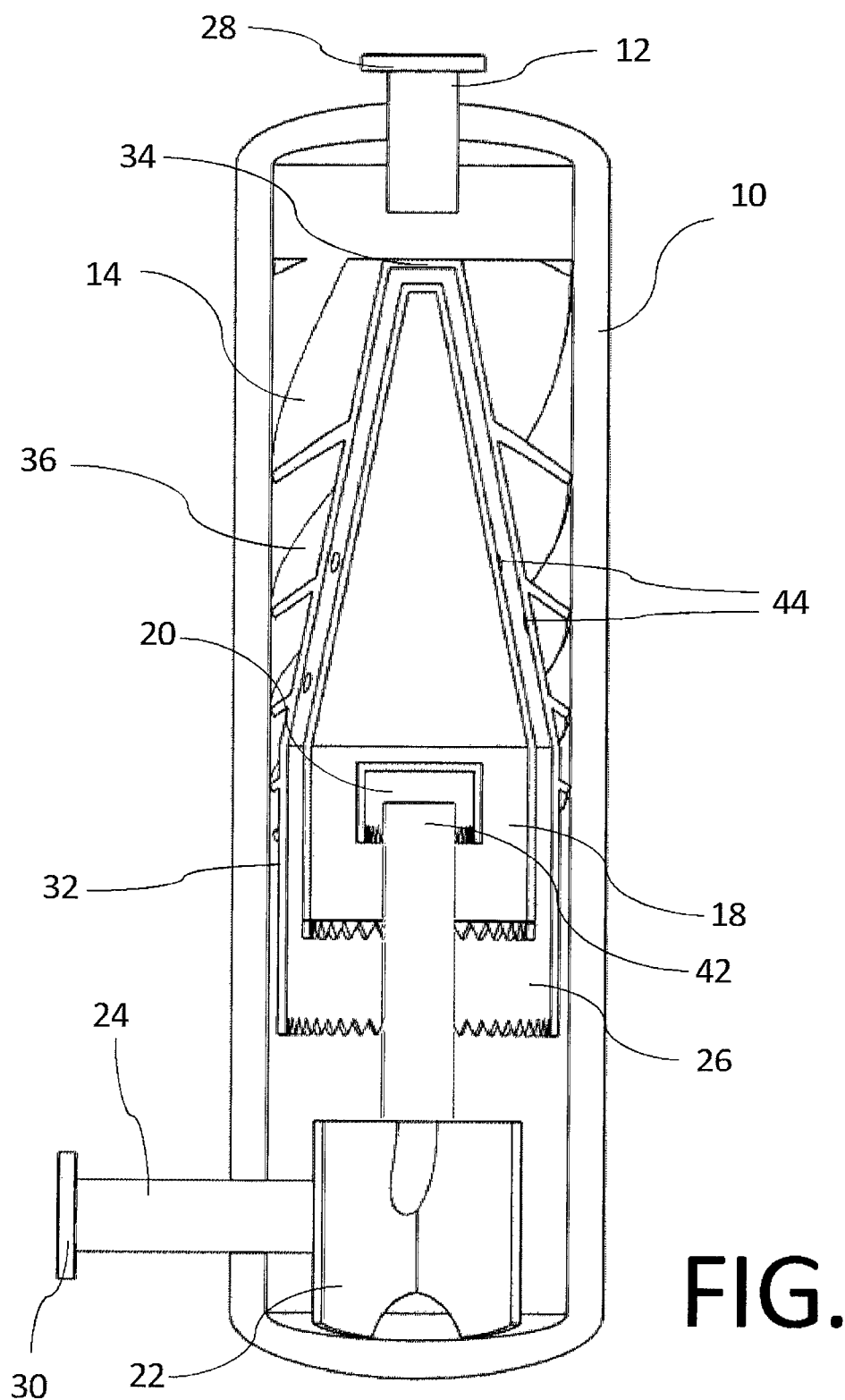
FIG. 5 is a cross-sectional view of a cylindrical vessel.
Figure 6:
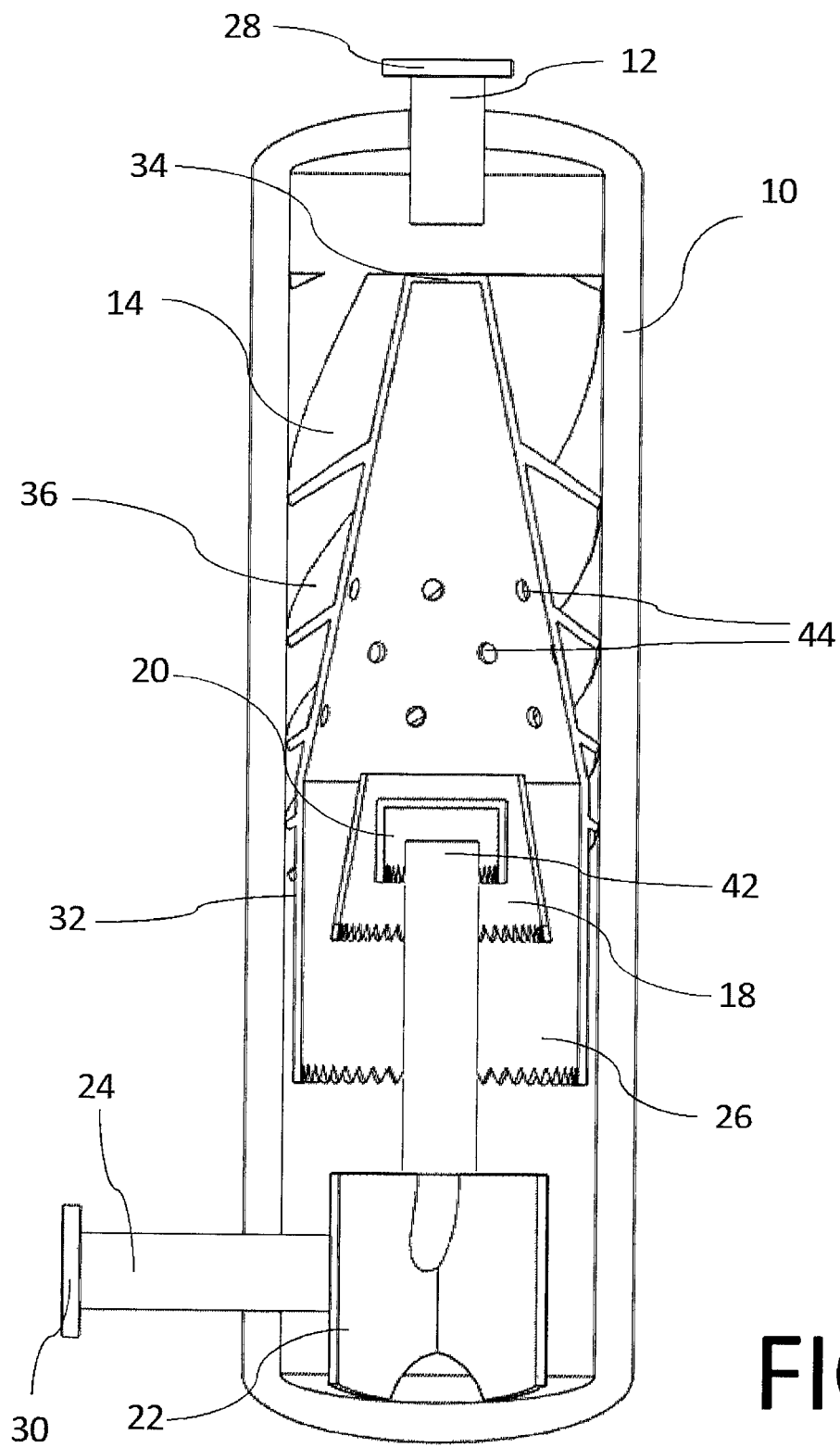
FIG. 6 is a cross-sectional view of an alternative cylindrical vessel.
Figure 7:
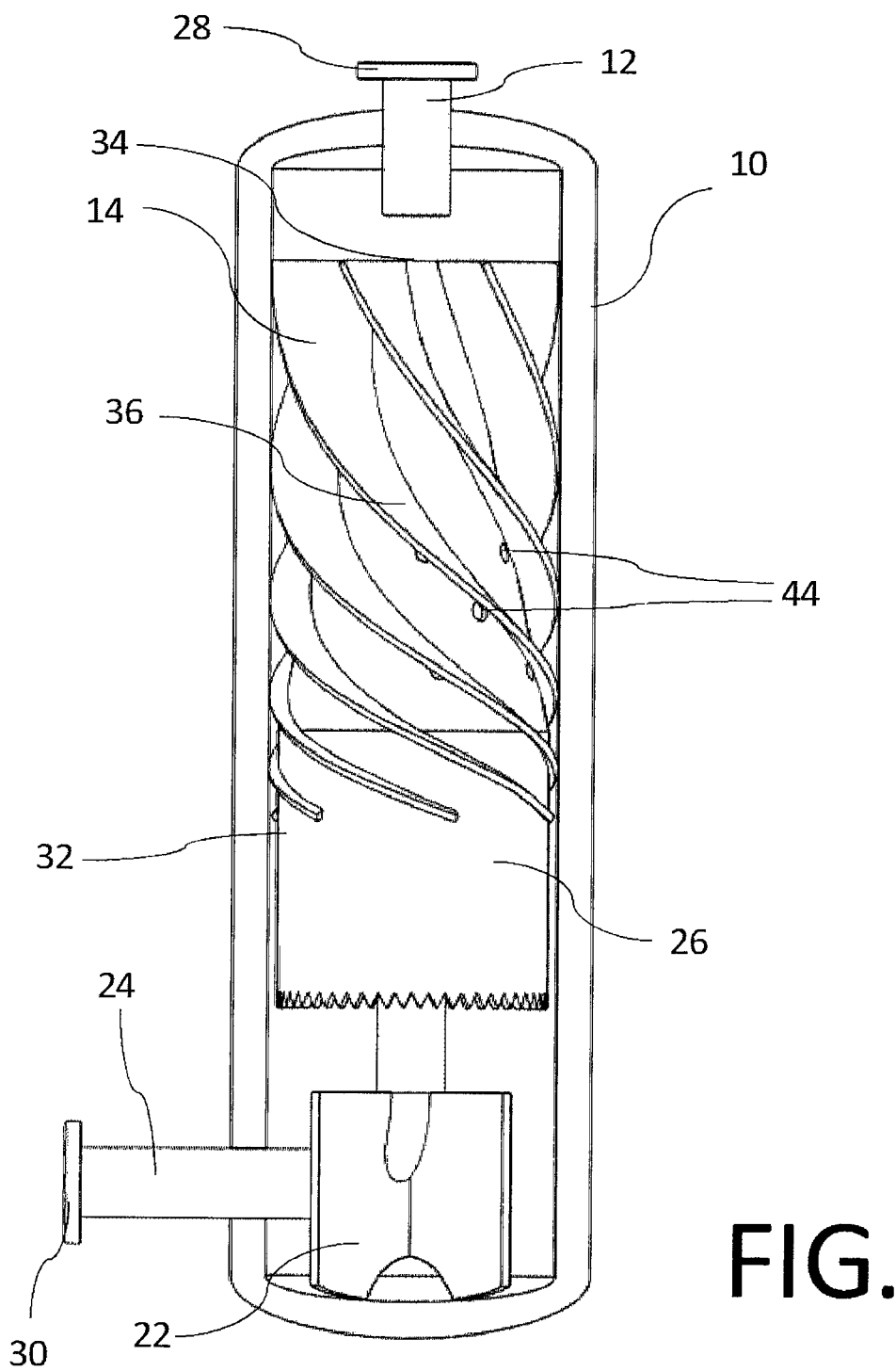
FIG. 7 is a partial cross-sectional view of the cylindrical vessel shown in FIG. 5.
Figure 9:
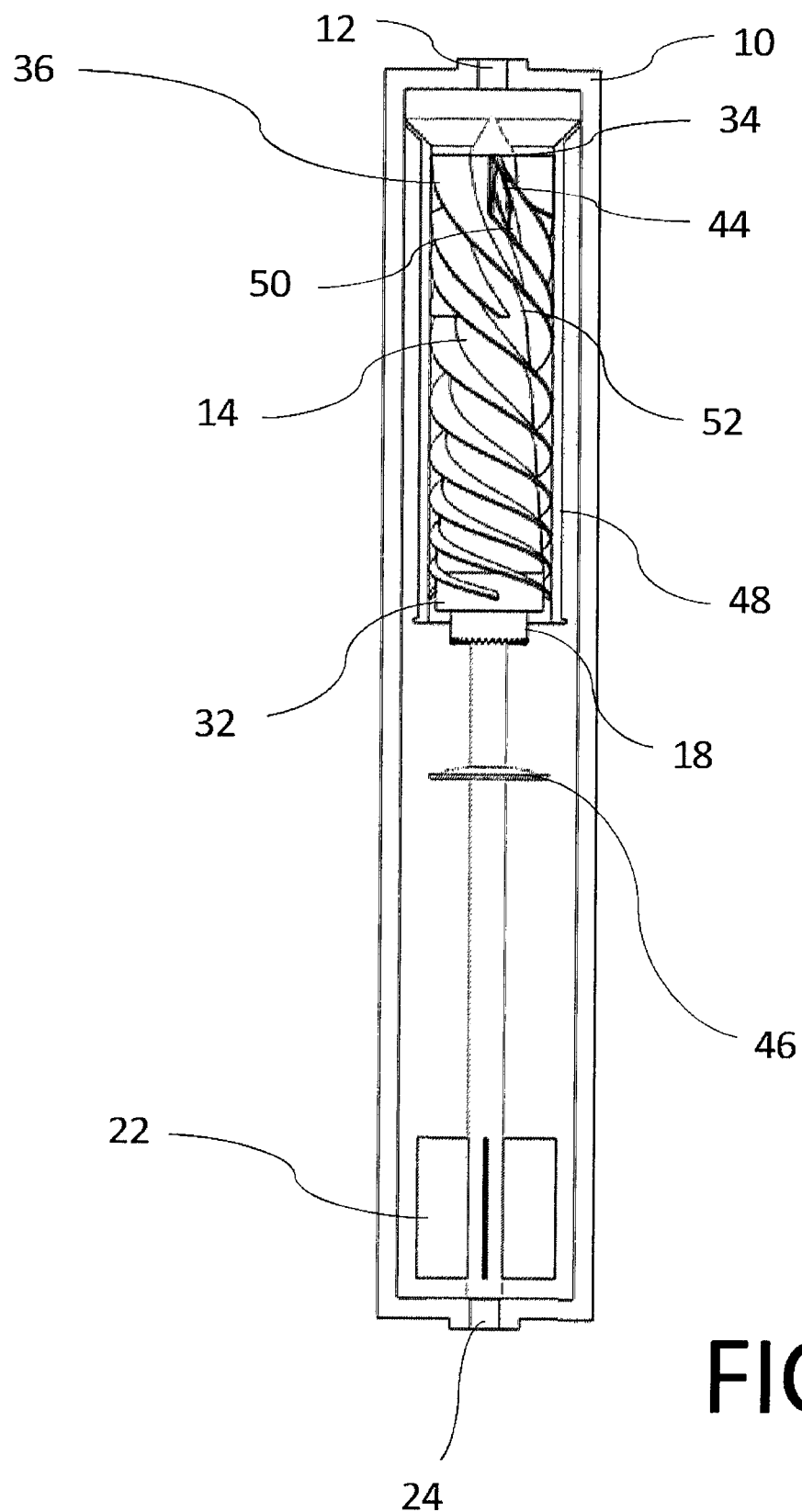
FIG. 9 is a detailed partial cross-sectional view of an enclosure within the cylindrical vessel.
Figure 10:
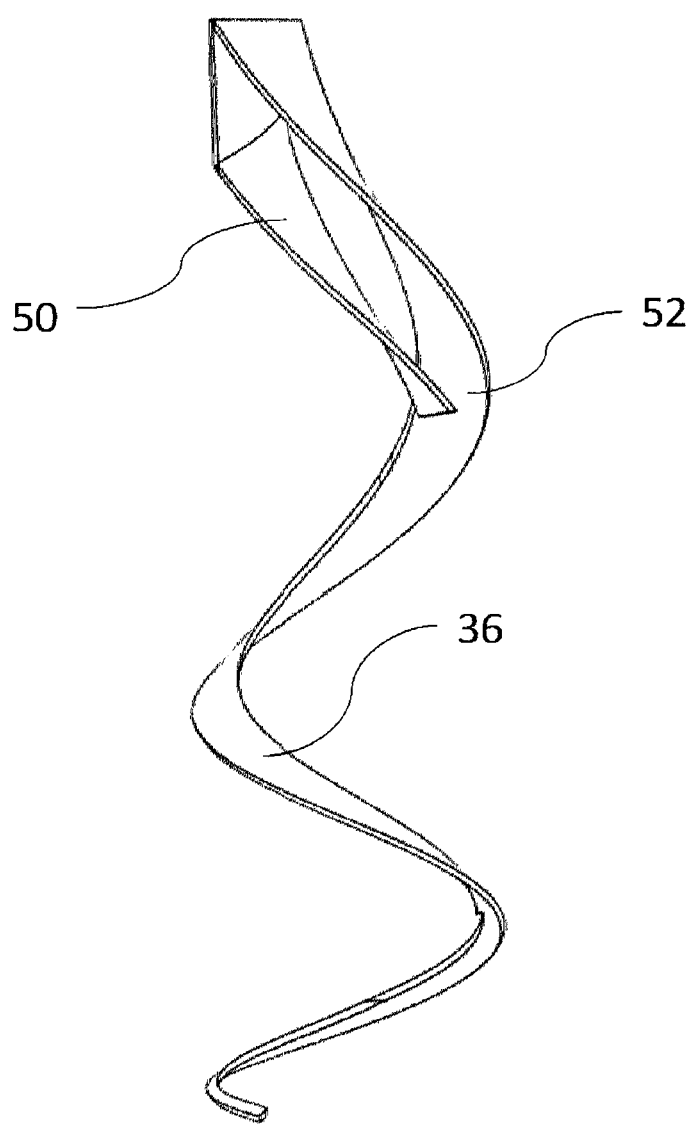
FIG. 10 is a perspective view of a vane forming a pocket.

Referring to FIG. 9, vanes 36 on enclosure 14 may be modified to provide a different flow path for gas through enclosure 14. As shown in FIG. 5, holes 44 are positioned immediately adjacent to the underside of vanes 36. This helps to ensure more gas, and less liquid or solids, passes into enclosure 14 through holes 11. This may be further enhanced by having vanes 36 angled down from enclosure 14 toward vessel 10 as shown. Alternatively, a more pronounced gas area may be formed by reshaping vanes 36. As shown in FIG. 9, vanes 36 have been doubled over to form a pocket 50, or in other words, the tops of adjacent vanes 36 are connected to form pocket 50, with holes 44 positioned within, and preferably toward the top, of pocket 50. The ends of vanes 36 are not connected, such that they form an entrance 52 into pocket 50 further down enclosure 14. Referring to FIG. 10, one vane 36 is preferably shorter than the other, such that entrance 52 is located at an intermediate position along enclosure 14. As such, fluid flowing in through inlet 12 will be directed by vanes into a swirling flowpath down the outside of enclosure 14. Partway down enclosure 14, gas is permitted to flow through entrance 52 of pockets 50 toward holes 44, while the remaining fluid will continue to flow down toward the bottom edge of enclosure 14. Providing a longer flow path to holes 44 for the gas may reduce the amount of entrained liquids and solids to that enter enclosure 14 through holes 44.

A person of ordinary skill will recognize that the various elements of the examples discussed above may be combined together in any reasonable combination, unless the purposes or structural requirements are mutually exclusive. As such, a thorough discussion of the various permutations and combinations will not be provided.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A separator for separating solid matter from a fluid stream, comprising:
   a vessel having an inlet port, a fluid outlet port, and a sand outlet port, each of the fluid outlet port and the sand outlet port being spaced below the inlet port;
   an enclosure disposed between the inlet port and the fluid outlet port that redirects the fluid stream passing from the inlet port to the fluid outlet port, the enclosure defining an inner cavity above a lower edge of the enclosure, the lower edge defining a liquid flow area;
   one or more vanes extending along at least a portion of an outer surface of the enclosure, the one or more vanes redirecting the fluid stream along a curved flow path as the fluid stream flows toward the lower edge; and
   a plurality of apertures adjacent to the one or more vanes, the plurality of apertures permitting fluid flow into the inner cavity of the enclosure;

wherein the fluid outlet port is disposed within the inner cavity at a height that is above the lower edge of the enclosure and below one or more apertures.

2. The separator of claim 1, wherein the vessel has a vertical axis, and the inlet port is aligned with the vertical axis.

3. The separator of claim 1, wherein the vessel is a vertically oriented cylinder.

4. The separator of claim 1, wherein the one or more vanes define a spiral having an outer diameter that engages an inner surface of the vessel, and an inner diameter that engages the outer surface of the enclosure.

5. The separator of claim 4, wherein the inner diameter of the vanes increases as the fluid stream moves down the outer surface of the enclosure.

6. The separator of claim 4, wherein the vanes are angled downward from the enclosure toward the inner surface of the vessel.

7. The separator of claim 1, wherein the enclosure comprises a conical section having an increased diameter toward the fluid outlet port relative to the inlet port, and a skirt section having a constant diameter that extends below the conical section, the one or more vanes being mounted to the conical section of the enclosure.

8. The separator of claim 1, further comprising one or more secondary baffle positioned within the enclosure, the one or more secondary baffle surrounding the fluid outlet port and having a bottom edge that extends below the fluid outlet port and defines a secondary liquid flow area.

9. The separator of claim 8, wherein the bottom edge of the one or more secondary baffle is spaced above the lower edge of the enclosure.

10. The separator of claim 8, wherein at least one secondary baffle comprises an upper edge that is above the height of the fluid outlet port and one or more flow openings that are at or below the height of the fluid outlet port.

11. The separator of claim 8, wherein at least one secondary baffle has an angled sidewall such that the secondary baffle has a decreased diameter toward the inlet port relative to the fluid outlet port.

12. The separator of claim 8, wherein at least one secondary baffle has a closed top.

13. The separator of claim 8, wherein at least one secondary baffle has an open top.

14. The separator of claim 8, comprising two or more secondary baffles, the two or more secondary baffles being positioned concentrically around the fluid outlet port, each secondary baffle having a different diameter such that an outer secondary baffle surrounds an inner secondary baffle, the bottom edge of the outer secondary baffle being level with or extending below the bottom edge of the inner secondary baffle relative to the fluid outlet port.

15. The separator of claim 1, wherein, in use, the height of the fluid outlet port defines a liquid level within the inner cavity.

16. The separator of claim 1, wherein a pitch of the one or more vanes varies along the curved flow path to control a rotation speed of the fluid stream.

17. The separator of claim 1, wherein at least one pair of adjacent vanes are connected toward a top of the enclosure to form a pocket, at least one aperture is positioned within the pocket such that the pair of adjacent vanes defines an extended flow path between the inlet port and the at least one aperture.

18. The separator of claim 1, further comprising a laterally-extending baffle spaced below the lower edge of the enclosure and above a bottom of the vessel, the laterally-extending baffle reducing recirculation of particulates at the bottom of the vessel.

19. A separator for separating solid matter from a fluid stream, comprising:
a vessel having an inlet port, a fluid outlet port, and a sand outlet port, each of the fluid outlet port and the sand outlet port being spaced below the inlet port;
an enclosure disposed between the inlet port and the fluid outlet port that redirects the fluid stream passing from the inlet port to the fluid outlet port, the enclosure defining an inner cavity above a lower edge, the lower edge defining a liquid flow area; and
an inner baffle spaced within the enclosure, the inner baffle having a bottom edge that extends below the lower edge of the enclosure and an upper edge that extends above the lower edge of the enclosure, the inner baffle comprising one or more flow openings that are spaced between the bottom edge and the upper edge of the inner baffle;
wherein the fluid outlet port is at a height that is at or above the one or more flow openings of the inner baffle.

20. The separator of claim 19, wherein the vessel has a vertical axis, and the inlet port is aligned with the vertical axis.

21. The separator of claim 20, wherein the enclosure comprises one or more curved vanes on an upper surface of the enclosure that faces the inlet port, the one or more curved vanes inducing fluid to flow along a curved flow path.

22. The separator of claim 19, further comprising one or more secondary baffle positioned within the enclosure and within the inner baffle, the one or more secondary baffle surrounding the fluid outlet port and having a bottom edge that extends below the fluid outlet port and defines a secondary liquid flow area.

23. The separator of claim 22, wherein the bottom edge of the one or more secondary baffle is spaced below the lower edge of the enclosure.

24. The separator of claim 22, wherein at least one secondary baffle has an angled sidewall such that the secondary baffle has a decreased diameter toward the inlet port relative to the fluid outlet port.

25. The separator of claim 22, wherein at least one secondary baffle has a closed top.

26. The separator of claim 22, wherein at least one secondary baffle has an open top.

27. The separator of claim 22, comprising two or more secondary baffles, the two or more secondary baffles being positioned concentrically around the fluid outlet port, each secondary baffle having a different diameter such that an outer secondary baffle surrounds an inner secondary baffle, the bottom edge of the outer secondary baffle being level with or extending below the bottom edge of the inner secondary baffle relative to the fluid outlet port.

28. The separator of claim 19, wherein, in use, the height of the fluid outlet port defines a liquid level within the inner cavity.

29. The separator of claim 19, wherein the inner baffle spirals inward toward each opening, the opening being perpendicular to a sidewall of the vessel.

30. The separator of claim 19, wherein the vessel is a spherical vessel.

* * * * *